Nov. 29, 1960 A. R. HAMILTON 2,961,815
AMPULE FILLING AND SEALING MACHINE
Filed June 1, 1960
2 Sheets-Sheet 1
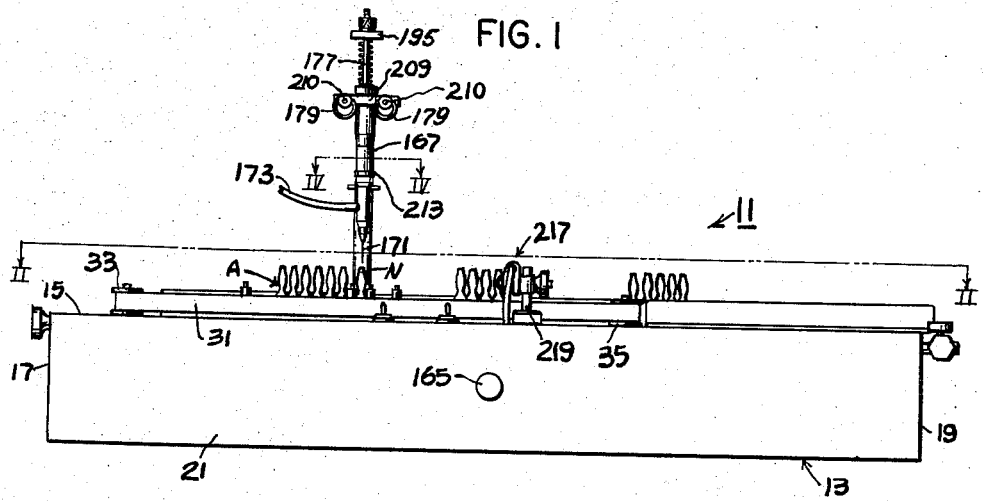
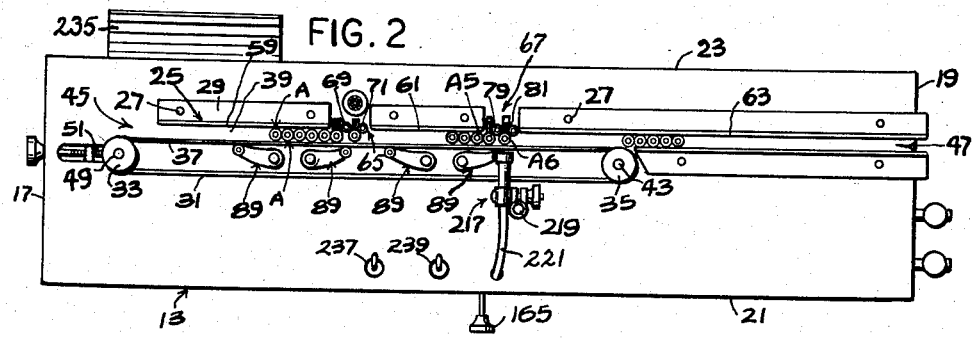
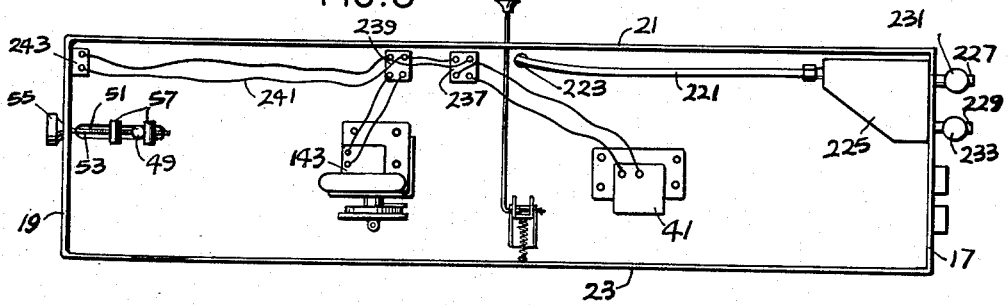
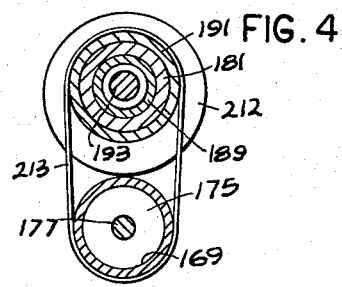
INVENTOR
ARTHUR R. HAMILTON
BY John R. Walker, III
ATTORNEY Nov. 29, 1960     A. R. HAMILTON     2,961,815
AMPULE FILLING AND SEALING MACHINE
Filed June 1, 1960     2 Sheets-Sheet 2
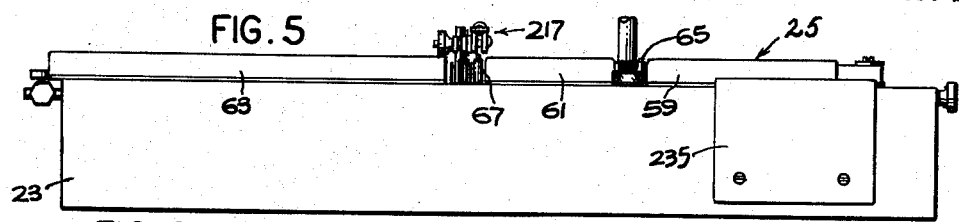
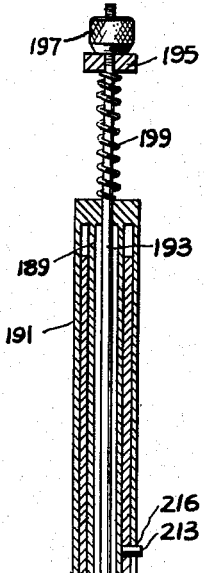
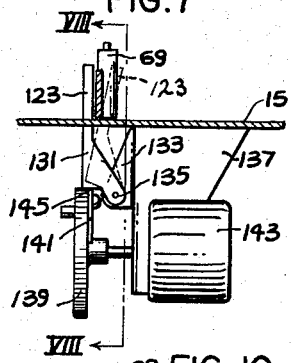
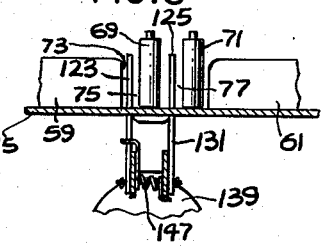
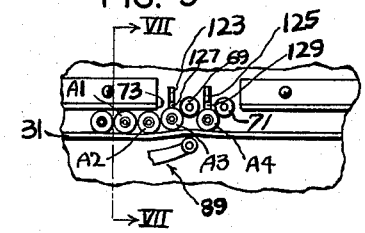
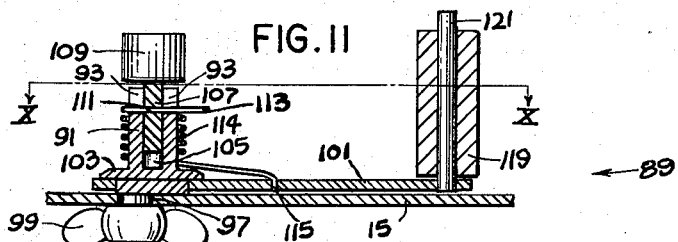
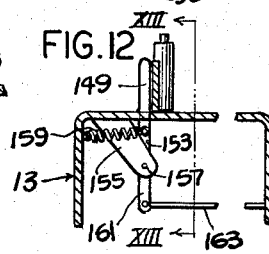
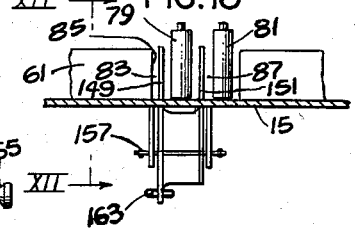
INVENTOR
ARTHUR R. HAMILTON
BY *John R. Walker, III*
ATTORNEY United States Patent Office 2,961,815
Patented Nov. 29, 1960

2,961,815
AMPULE FILLING AND SEALING MACHINE
Arthur R. Hamilton, 402 N. Mendenhall Road, Memphis, Tenn., assignor of one-half to Fred B. Kiger, Memphis, Tenn.

Filed June 1, 1960, Ser. No. 33,218
6 Claims. (Cl. 53—266)

This invention relates to a machine adapted to fill and then seal ampules.

Heretofore, machines for filling and sealing ampules have been complex in construction and expensive to manufacture. These previous machines have been more suited for a large factory operation, and out of the monetary reach of most small businesses and individuals. There has been a need for a small portable ampule filling machine which is reasonable in price and yet which has a production rate far surpassing that which could be obtained by hand filling and sealing of ampules.

Thus, one of the objects of the present invention is to provide an ampule filling machine which is simple in construction and economical to manufacture, thereby justifying its use by small businesses and individuals.

A further object is to provide such a machine which is portable so that it may be used in a variety of ways and places heretofore not possible.

A further object is to provide such a machine having a unique means for conveying and positioning the ampules.

A further object is to provide unique means for applying pressure to the conveyor belt of the machine so that the exact amount and position of the pressure can be carefully controlled, as for example, to compensate for different sized ampules.

A further object is to provide means for holding the ampules in a holding or waiting position and means for causing an ampule to be conveyed into the operating position simultaneously with the movement of an ampule from the operating position.

A further object is to provide an improved means for filling the ampules.

A further object is, generally, to improve the design and construction of ampule filling and sealing machines.

The means by which the foregoing and other objects of the present invention are accomplished and the manner of their accomplishment will be readily understood from the following specification upon reference to the accompanying drawings, in which:

Fig. 1 is a front elevational view of the machine of the present invention.

Fig. 2 is a sectional view taken as on the line II—II of Fig. 1.

Fig. 3 is a bottom view of the machine of the present invention.

Fig. 4 is an enlarged sectional view taken as on the line IV—IV of Fig. 1.

Fig. 5 is an elevational view of the back of the machine of the present invention.

Fig. 6 is an enlarged fragmentary sectional view taken as on a vertical plane through the center of the mechanism for movably supporting and operating the filling syringe, and with parts being removed for purposes of illustration.

Fig. 7 is an enlarged fragmentary sectional view taken as on the line VII—VII of Fig. 9.

Fig. 8 is a fragmentary sectional view taken as on the line VIII—VIII of Fig. 7.

Fig. 9 is a fragmentary plan view of the part of the device shown in Fig. 2 adjacent the filling area.

Fig. 10 is a sectional view taken as on the line X—X of Fig. 11.

Fig. 11 is an enlarged fragmentary cross-sectional view taken as on a vertical plane substantially through the center-line of one of the pressure means of the present invention with parts being shown in elevation for purposes of illustration.

Fig. 12 is a fragmentary sectional view taken as on the line XII—XII of Fig. 13.

Fig. 13 is a fragmentary sectional view taken as on the line XIII—XIII of Fig. 12.

Referring now to the drawings in which the various parts are indicated by reference characters, the machine 11 of the present invention includes a base 13, which comprises a top plate 15 having side members 17, 19 depending from opposite side edges thereof and having front and back members 21, 23 respectively depending from front and back edges thereof, so that base 13 is substantially rectangular and open bottomed.

An upstanding rail 25 is mounted on top plate 15 by suitable means as, for example, bolts 27 attaching the horizontal flange 29 of the rail to the top plate.

An upstanding continuous conveyor belt 31 formed of a resilient material as rubber or the like is led over an idler drum 33 and a driven drum 35 and positioned so that a portion of the belt as at 37 is disposed in spaced and substantially parallel relationship to rail 25 to establish a channel 39 therebetween adapted to receive ampules A. Belt 31 is driven by suitable means, as for example, motor 41 mounted on the bottom of top plate 15 with the shaft 43 extending upwardly through a suitable opening in the top plate and there-above with driven drum 35 fixedly mounted on the shaft. The belt 31 is driven clockwise when viewed from above as in Fig. 2 so that the portion 37 of the belt moves towards the right as viewed in this figure, whereby ampules A placed in the entrance end 45 of channel 39 are adapted to be conveyed towards the discharge end 47 of the channel. Thus, ampules A are placed with the bottoms thereof resting on top plate 15 and with the open neck portions N extending upwardly. In conveying the ampules down the channel 39, the conveyor belt urges the ampules against rail 25 and rolls the ampules along the rail with the bottom of the ampules sliding along top plate 15. It should be noted at this point that when the expression, "down the channel," is used, it is intended to mean a direction towards the discharge end or right as viewed in Fig. 2.

Suitable means is preferably provided for adjusting the position of drum 33 relative to drum 35 so that the tension on belt 31 may be changed. A preferred embodiment of such a means for changing the tension on belt 31 is best shown in Figs. 2 and 3 wherein it will be seen the drum 33 is rotatably mounted on a shaft 49 which shaft extends downwardly through an elongated slot 51 in top plate 15 and through which shaft threadedly extends a screw 53 that extends outwardly through an aperture in side member 17 where it is fitted with a knob 55 for rotating the screw to selectively move drum 33 towards and away from driven drum 35. A pair of keepers 57 are threadedly engaged on screw 53 on opposite sides of shaft 49 with the keepers slidably engaging the bottom of top plate 15 to prevent upward movement of screw 53 relative to top plate 15.

Rail 25 is preferably interrupted at two places along the length thereof to establish rail portions 59, 61 and 63 and to establish a pair of spaced gaps 65, 67 with gap 65 being between rail portions 59 and 61, and with gap 67 being between rail portions 61 and 63. Relative to channel 39, gap 65 is positioned behind gap 67, in the area of which the sealing takes place. It should be noted at this point that when the term "behind" is used regarding positions relative to channel 39, it is taken to mean that the position is towards the entrance end 45. In other words, referring to Fig. 9, the ampule at A1 is behind the ampule at A2, or vice versa, the ampule at A2 is in front of the ampule at A1.

A pair of upstanding spaced rollers 69, 71 are freely rotatably mounted from top plate 15. Rollers 69, 71 are inwardly offset from rail 25 towards belt 31 and roller 69 is spaced from the terminating end 73 of rail portion 59 to establish a holding pocket 75 between roller 69 and end 73 to hold an ampule as at A3. An operating pocket 77 is also established between rollers 69, 71 to hold an ampule as at A4 during the filling of the ampule, later to be described. The ampules at A3 and A4, while in these positions, are simply rotated in position and it will be understood that they will be blocked from moving down the channel by rollers 69, 71, respectively. Also, it will be understood that the ampules behind ampule A3 will normally be prevented from moving down the channel by the ampule A3 and these ampules behind A3 will simply rotate in position sliding against rail 25.

A similar pair of rollers 79, 81 are provided adjacent gap 67 and spaced in the same manner to provide a holding pocket 83 between roller 79 and the terminating end 85 of rail portion 61, and to provide an operating pocket 87 between the rollers. These rollers 79, 81 perform the same function as rollers 69, 71 to hold an ampule as at A5 in the holding pocket, and to hold an ampule as at A6 in the operating pocket. Also, it will be understood that ampule A5 will normally restrain the other ampules immediately behind it to prevent these ampules from moving down the channel 39.

The yielding pressure means acting on belt 31 and hereinafter to be described forms an important part of the present invention since the ampules, when in the positions above-described must not be gripped too greatly by belt 31 or the belt will cause those ampules to be moved down channel 39 and yet the belt must grip the ampules sufficiently to cause rotation of the ampules, particularly at the operating position A6, as will be more fully understood in the description to follow. In addition, sufficient pressure must be exerted to prevent the ampules A3, A4, A5 and A6 from accidentally leaving their respective pockets. All of the yielding pressure means which are indicated in general as at 89 and which preferably comprise four in number, although more or less may be provided, are substantially identical and a description of one follows:

Pressure device 89 comprises an upstanding post 91 having a plurality of circumferentially spaced notches 93 in the upper end thereof. A threaded extension 95 smaller in diameter than post 91 is fixedly attached to the lower end of post 91 at a place offset from the center of the post and extends downwardly through an aperture 97 in top plate 15 and upon which is threadedly engaged a wing nut 99 to secure post 91 in a selected position. Thus, it will be understood that since extension 95 is offset relative to the center of post 91, the post is eccentrically mounted.

An arm 101 is swingably mounted adjacent its inner end on post 91 with the post extending through an aperture in the arm. A collar 103 provided on post 91 limits upward movement of arm 101. Post 91 is provided with an upwardly opening bore 105 in the upper end thereof in which is slidably received a pin 107, that has fixedly attached adjacent the upper end thereof a knob 109 for manipulating the pin. A transverse hole 111 extends through pin 107 and in which is received the inner end portion 113 of a coiled spring 114 which is disposed around post 91, and the lower end of which is provided with an outwardly extending portion which is bent downwardly at its outer end as at 115 and adapted to be selectively inserted in one of a plurality of apertures 117 provided in spaced relationship across arm 101. An upstanding idler roller 119 is rotatably mounted on arm 101 adjacent the outer end thereof by suitable means, as for example, the upstanding pin 121 fixedly attached to the arm and upon which is rotatably received the roller.

The pressure devices 89 are mounted on top plate 15 in various positions so that rollers 119 engage the back side of portion 37 of the belt, i.e., the side of the belt remote from channel 39, and the springs 114 are arranged to urge arms 101 in a direction to cause rollers 119 to yieldingly press against the belt. The preferable positions of devices 89 are shown in Fig. 2, wherein it will be seen one of the devices is positioned opposite rail portion 59 to urge the ampules against the rail portion, one is positioned opposite gap 65 to urge ampules A3 and A4 into their respective pockets, one is positioned opposite rail portion 61 to urge the ampules against this rail portion, and one is positioned opposite gap 67 to urge ampules A5 and A6 into their respective pockets. If desired, other pressure devices 89 may be provided without departing from the spirit and scope of the present invention.

From the foregoing, it will be understood that the position and pressure of idler rollers 119 against belt 31 may be varied by loosening wing nut 99 and changing the position of post 91. Also, it will be understood, another adjustment may be accomplished by changing the amount of tension of spring 114 by lifting pin 107 by means of knob 109 and repositioning end portion 113 in another one of notches 93. This repositioning is done by lifting knob 109 and turning the knob until end portion 113 is above the desired notch 93, and then releasing the knob to allow the end portion 113 to drop down into the desired notch. In addition, the tension on spring 114 may be changed by changing the outer end portion 115 to another one of apertures 117. Thus, by means of the above-described adjustments, the exact amount and position of the pressure exerted on belt 31 by roller 119 can be very accurately and carefully controlled.

Means are provided for simultaneously urging the ampules at A3, A4 out of the respective holding and operating pockets 75, 77, which means are preferably constructed as follows:

A pair of upstanding fingers 123, 125 respectively extend upwardly through slots 127, 129 provided in top plate 15, which fingers are respectively disposed adjacent holding pocket 75 and operating pocket 77. Fingers 123, 125 are fixedly mounted on a bracket 131 which, in turn, is pivotally mounted on a fixed bracket 133, as by means of a pin 135 extending through aligned apertures in the brackets 131, 133 so that bracket 131 is pivotable about a horizontal axis. Bracket 133 is mounted on another bracket 137 which, in turn, is mounted on the bottom of plate 15.

A circular cam wheel 139, having a cam lobe 141 extending outwardly therefrom, is rotatably driven about a horizontal axis, by suitable means, as for example, motor 143 mounted on bracket 137. A heel 145 of bracket 131 rides on cam wheel 139 and is urged against the cam wheel by means of a spring 147. When heel 145 is riding on the circular part of cam wheel 139 the fingers 123, 125 are in retracted positions, as best in Fig. 9, respectively behind holding pocket 75 and operating pocket 77. When heel 145 rides over cam lobe 141, the fingers 123, 125 are simultaneously urged forwardly into the dotted line position shown in Fig. 7 whereupon the ampules A3, A4 are urged out of their respective pockets and the ampule at A4 is carried down the conveyor toward the sealing area, and the ampule at A3 is moved into position formerly held by the ampule at A4, and the ampule behind the ampule formerly at A3 is moved into the holding position.

A similar type of device is provided adjacent the sealing area to move the ampules simultaneously at A5 and A6 out of their respective pockets, the only difference between the two devices being that at the filling area the device is automatically operated, whereas at the sealing area, the device is manually operated. Thus, a pair of upstanding fingers 149, 151 extend through slots in the top plate 15 and are mounted upon a bracket 153 which, in turn, is pivotally mounted from a fixed bracket 155 fixedly attached to the bottom of top plate 15 with the pivotal mounting preferably being by means of a pin 157 extending through aligned apertures in the brackets 153, 155. A tension spring 159 extends between bracket 153 and base 13 to urge fingers 149, 151 in retracted positions, as best seen in Figs. 2 and 12, behind the holding pocket 83 and the operating pocket 87, respectively. Bracket 153 extends below its pivotal mounting with bracket 155 for a portion as at 161 to which portion is pivotally mounted the end of a horizontally extending rod 163, which extends forwardly out through an aperture in base 13 and therebeyond. A knob 165 is mounted on the distal end of rod 163 so that the rod may be manually pushed inwardly by pressure on the knob to cause fingers 149, 151 to move forwardly against the ampules at A5 and A6 in a manner similar to the operation of the fingers 123, 125 to cause the ampule previously at A–6 to move down the conveyor towards the exit end and to cause the ampule previously at A5 to move to the position at A6 and the ampules therebehind to move down one position.

Means is provided for filling the ampule at A4, and is preferably constructed as follows:

A syringe 167 is supported above operating pocket 77 by means to be described hereinafter. Syringe 167 is of the usual type used by doctors for injections and includes the usual syringe cylinder 169, the usual injection needle 171 communicating with the cylinder, and a hose 173 communicates at one end with cylinder 169 and leads to a supply of the material so that a continuous supply of material is provided at all times. In the drawings, the supply of material is not shown but only a portion of the hose 173 leading therefrom is shown in Fig. 1. Suitable valve means, not shown, is provided for permitting the material to flow through hose 173 towards the syringe 167 but preventing reverse flow. Syringe 167 includes the usual piston 175 slidably mounted in cylinder 169 and the usual operating rod 177 connected to the piston. In addition, syringe 167 includes the usual circular finger grips 179 disposed on opposite sides thereof.

Means are provided for movably supporting syringe 167 and are preferably constructed as follows:

A hollow upstanding cylinder 181 extends through an aperture 183 in plate 15 and is rigidly mounted from the plate by means of lock nuts 185, 187 which threadedly engage a threaded portion 188 on the cylinder respectively above and below the plate 15, as best seen in Fig. 6. An inner sleeve 189 slidably extends through the interior of cylinder 181 and is rigidly attached adjacent its upper end to an outer sleeve 191 which is slidably mounted around the exterior of cylinder 181. Thus, inner and outer sleeves 189, 191 are adapted for upward and downward reciprocation relative to cylinder 181 and move together as a unit. A rod 193 slidably extends through inner sleeve 189. A substantially horizontally projecting arm 195 is removably attached adjacent the upper end of rod 193 as by the rod extending through an aperture, not shown, in the arm, and a knurled nut 197 is threadedly engaged on the upper threaded end of rod 193 to clampingly hold arm 195. Arm 195 projects above the operating rod 177 of syringe 167 and is fixedly attached to the operating rod by suitable means. A spring 199 extends between the upper ends of sleeves 189, 191 and arm 195 to urge the arm and rod 193 upwardly relative to sleeves 189, 191. This upward movement is limited by means of an adjustable nut 201 threadedly engaged adjacent the lower threaded end of rod 193 and adapted to contact the lower end of inner sleeve 189. Fixedly attached adjacent the lower end of rod 193 below nut 201 is a cross head 203 having a laterally extending slot 205 in which slidably extends a pin 207 that is fixedly attached to cam wheel 139 at a place spaced from the center thereof, so that as the cam wheel rotates rod 193 is caused to reciprocate upwardly and downwardly.

Syringe 167 is removably mounted on outer sleeve 191 by suitable means as a cross bar 209 fixedly mounted on and laterally extending in opposite directions from the outer sleeve and to which the finger grips 179 are clamped thereto by means of suitable bolt and nut means 210. An eccentric ring 212 is rotatably mounted around outer sleeve 191; and resilient means, as an elastic band 213 is looped around outer sleeve 191 and syringe 167 to yieldingly hold the syringe against ring 212. By turning eccentric ring 212 it will be understood that the lower end of the syringe 167 may be moved away from and towards outer sleeve 191 to provide an adjustment for centering needle 171 relative to neck N of the ampule at A4.

The following is a description of the filling operation starting at the point in the cycle of operation with the syringe 167 in an upward position, as shown in Fig. 1, and assuming that cam wheel 139 rotates in a clockwise direction as viewed in Fig. 6. With the syringe 167 in its uppermost position, as above-described, it will be understood that pin 207 will be in a position directly above the center of cam wheel 139. Also, with the syringe 167 in said uppermost position an ampule has just entered the operating position at A4 and is rotating in place thereat. As cam wheel 139 rotates clockwise, pin 207 is carried clockwise downwardly which carries rod 193, inner sleeve 189 and outer sleeve 191 downwardly therewith which, in turn, carries syringe 167, as a whole, downwardly therewith until the injection needle 171 enters the open upper end of the ampule which is at position A4. Fig. 6 shows the parts in a position just before the material is injected into the ampule at A4. At this point, shown in Fig. 6, the outer sleeve, which up to this point has been moving downwardly, will be limited in its downward movement by a pin 213 fixedly mounted on cylinder 181 and which extends outwardly through a slot 215 in the outer sleeve with limiting motion of the outer sleeve being accomplished when the pin 213 contacts the portion of the outer sleeve as at 216 which defines the upper end of slot 215. The above-decribed limiting movement of outer sleeve 191 stops inner sleeve 189 and syringe 167 which are attached thereto. Continuing movement of cam wheel 139 clockwise from the above-described position in Fig. 6 will cause rod 193 to continue to move downward carrying arm 195 downwardly and compressing spring 199 which downward movement of arm 195 pushes the operating rod 177 of the syringe downwardly to eject the material into the ampule at A4. When pin 207 reaches its lowermost position beneath the center of cam wheel 139 the ejection of the material stops and continued movement causes operating rod 177 to raise and cause material to be drawn into syringe 167 through hose 173. When pin 207 reaches the corresponding position on the other side opposite from that shown in Fig. 6, nut 201 contacts the lower end of inner sleeve 189 and then continued movement of the cam wheel causes the inner sleeve 189, outer sleeve 191 and syringe 167 to be lifted as a unit so that the syringe is carried upwardly out of the ampule at A4. The next step in the cycle of operation is for cam lobe 141 to contact bracket 131 and cause the fingers 123, 125 to move the ampules A3, A4 out of their respective pockets as heretofore described and allow the ampules therebehind to move into the pockets formerly held by these ampules ready for the next cycle.

At the sealing area, suitable sealing means is provided, as a burner 217 directed so that the flame thereof plays on the neck of the ampule at A6 for the sealing thereof while rotating in place at this operating position. After the ampule at A6 is sealed, then the operator pushes in the button 165 to eject the ampules at A5 and A6, as heretofore described.

Burner 217 is preferably supported from base 13 by a suitable stand 219 and pipe 221 is connected at one end to burner 217 and extends through an aperture 223 to a suitable gas mixer 225 having the usual inlet pipes 227, 229 through which suitable gases, from a supply not shown, are introduced to the mixer, as for example, oxygen and propane. In addition, suitable valves 231 and 233 may be provided for inlet pipes 227, 229, respectively.

From the foregoing, it will be understood that a very unique and simple machine is provided which is portable and easy to operate by a single operator. For the operator's convenience, a removable holder 235 is preferably provided which extends upwardly at an angle from the back 23 of the machine and upon which is adapted to be placed a tray, not shown, of the ampules A. Thus, the operator simply picks the ampules up from the tray and loads them into the entrance end 45 of the conveyor and his attention is only needed to the sealing operation whereupon as each ampule is sealed, he merely pushes the button 165.

Also, if desired, suitable electrical switches 237, 239 are provided in the electrical wiring 241 respectively leading to motors 41, 143 with the switches perferably being mounted on top plate 15. Wiring 241 is preferably connected to a plug 243 mounted on side member 19 and into which is adapted to be inserted the plug of an extension cord, not shown, leading from an electrical supply, not shown.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A machine for successively filling and sealing ampulses, said machine comprising a substantially horizontal top plate adapted to slidably support the ampules, said top plate having spaced ampule filling and sealing areas thereon, a rail upstanding from said top plate, a resilient continuous conveyor belt having an adjacent portion thereof in spaced substantially parallel relationship to said rail to establish a channel therebetween adapted to receive ampules adjacent one end thereof and discharge the ampules adjacent the opposite end thereof, means for driving said conveyor belt in a direction to carry said adjacent portion of said belt from adjacent the receiving end of said channel towards the discharge end thereof, pressure means for applying pressure against said conveyor belt to urge the ampules into engagement with said rail whereby the ampules are adapted to be rolled thereon and to be conveyed from the receiving end of said channel towards the discharge end thereof; said rail being interrupted at two places along the length thereof to establish first, second and third rail portions and to establish a pair of spaced gaps intermediate the ends of said rail; one of said gaps being towards the receiving end of said channel from the other of said gaps and being adjacent said ampule filling area, said other of said gaps being adjacent said ampule sealing area, said first and second rail portions respectively having terminating ends respectively adjacent said first and second gaps, pairs of upstanding rollers respectively rotatably mounted adjacent said gaps, each of said pairs of rollers being respectively spaced apart to respectively establish operating pockets at said filling and sealing areas, said pairs of rollers being respectively offset inwardly towards said belt from said rail portions and being respectively spaced from said terminating ends of said rail portions to respectively establish holding pockets adjacent said operating pockets at the respective filling and sealing areas, each of said operating pockets being down the channel from its adjacent holding pocket, resilient means for urging said belt towards the holding and operating pockets at said filling area whereby the ampules thereat are rotated in position and in conjunction with the pair of rollers at said filling area are prevented from being conveyed down said channel, means for injecting material into the ampule in the operating pocket at said filling area, means for simultaneously urging the ampules from the holding and operating pockets at said filling area against said belt and said resilient means whereby the ampule in the operating pocket at said filling area is conveyed out of the pocket and down said channel towards said sealing position and the ampule in the holding pocket at said filling area is conveyed to the operating pocket of said filling area, additional resilient means for urging said belt towards the holding and operating pockets at said sealing area whereby the ampules thereat are rotated in position and in conjunction with said pair of rollers at said sealing area are prevented from being conveyed down said channel, means for sealing the ampule in the operating pocket at said sealing area, and means for simultaneously urging the ampules from the holding and operating pockets at said sealing area against said belt and said additional resilient means whereby the ampule in the operating pocket at said sealing area is conveyed out of the pocket and down said channel towards the exit end of said channel and the ampule in the holding pocket at said sealing area is conveyed to the operating pocket at said sealing area.

2. A machine for successively filling and sealing ampules, said machine comprising a substantially horizontal top plate adapted to slidably support the ampules, said top plate having spaced ampule filling and sealing areas thereon, a rail upstanding from said top plate, a resilient continuous conveyor belt having an adjacent portion thereon in spaced substantially parallel relationship to said rail to establish a channel therebetween adapted to receive ampules adjacent one end thereof and discharge the ampules adjacent the opposite end thereof, means for driving said conveyor belt in a direction to carry said adjacent portion of said belt from adjacent the receiving end of said channel towards the discharge end thereof, pressure means for applying pressure against said conveyor belt to urge the ampules into engagement with said rail whereby the ampules are adapted to be rolled thereon and to be conveyed from the receiving end of said channel towards the discharge end thereof, means for establishing holding and operating pockets for ampules at said filling area, means for establishing holding and operating pockets for ampules at said sealing area, resilient means for urging said belt towards the holding and operating pockets at said filling area to prevent the ampules thereat from being conveyed down said channel, means for injecting material into the ampule in the operating pocket at said filling area, means for simultaneously urging the ampules from the holding and operating pockets at said filling area against said belt and said resilient means whereby the ampule in the operating pocket at said filling area is conveyed out of the pocket and down said channel towards said sealing position and the ampule in the holding pocket at said filling area is conveyed to the operating pocket of said filling area, additional resilient means for urging said belt towards the holding and operating pockets at said sealing area to prevent the ampules thereat from being conveyed down said channel, means for sealing the ampule in the operating pocket at said sealing area, and means for simultaneously urging the ampules from the holding and operating pockets at said sealing area against said belt and said additional resilient means whereby the ampule in the operating pocket at said sealing area is conveyed out of the pocket and down said channel towards the exit end of said channel and the ampule in the holding pocket at said sealing area is conveyed to the operating pocket at said sealing area.

3. The structure according to claim 1 wherein said resilient means and said additional resilient means each comprises an upstanding post having circumferentially spaced notches in the upper end thereof, an arm having inner and outer ends, an upstanding idler roller rotatably mounted from said arm adjacent the outer end thereof, said arm being swingably mounted adjacent the inner end thereof from said post whereby said arm is adapted to be swung towards and away from said belt, said arm being provided with apertures spaced across said arm, said post having an upwardly opening bore in the upper end thereof, a pin slidably received in said bore, a knob fixedly attached to said pin adjacent the upper end thereof above said post for positioning of said pin, said pin being provided with a hole therethrough, a coil spring disposed around said post and being arranged to urge said arm in a direction to carry said idler roller into engagement with said belt, said coiled spring having an inner end portion adjacent one end thereof and an outer end portion adjacent the opposite end thereof, said inner end portion extending through said hole and being adapted to selectively extend through one of said notches for adjusting the tension on said spring, said outer end portion being adapted to extend into a selected one of said apertures to provide a second adjustment for said spring, and said post being eccentrically mounted from said top plate to selectively move said roller towards and away from said belt to vary the position and force of the resilient means against said belt.

4. The structure according to claim 2 wherein said resilient means and said additional resilient means each comprises an upstanding post having circumferentially spaced notches in the upper end thereof, an arm having inner and outer ends, an upstanding idler roller rotatably mounted from said arm adjacent the outer end thereof, said arm being swingably mounted adjacent the inner end thereof from said post whereby said arm is adapted to be swung towards and away from said belt, said arm being provided with apertures spaced across said arm, said post having an upwardly opening bore in the upper end thereof, a pin slidably received in said bore, a knob fixedly attached to said pin adjacent the upper end thereof above said post for positioning of said pin, said pin being provided with a hole therethrough, a coiled spring disposed around said post and being arranged to urge said arm in a direction to carry said idler roller into engagement with said belt, said coiled spring having an inner end portion adjacent one end thereof and an outer end portion adjacent the opposite end thereof, said inner end portion extending through said hole and being adapted to selectively extend through one of said notches for adjusting the tension on said spring, said outer end portion being adapted to extend into a selected one of said apertures to provide a second adjustment for said spring, and said post being eccentrically mounted from said top plate to selectively move said roller towards and away from said belt to vary the position and force of the resilient means against said belt.

5. The structure according to claim 2 in which said means for injecting material into the ampule in said operating pocket at said filling area comprises a syringe including a syringe cylinder, an injection needle communicating with said cylinder, means for supplying the material into said cylinder, a piston slidably mounted in said cylinder, and an operating rod connected to said piston; means for lowering said syringe to carry said needle into the ampule, means for depressing said rod while said needle is in the ampule to cause material to flow into the ampule from said cylinder through said needle, and means for raising said syringe to withdraw said needle from said ampule after the filling thereof.

6. The structure according to claim 4 in which said means for injecting material into the ampule in said operating pocket at said filling area comprises a syringe including a syringe cylinder, an injection needle communicating with said cylinder, means for supplying the material into said cylinder, a piston slidably mounted in said cylinder, and an operating rod connected to said piston; means for lowering said syringe to carry said needle into the ampule, means for depressing said rod while said needle is in the ampule to cause material to flow into the ampule from said cylinder through said needle, and means for raising said syringe to withdraw said needle from said ampule after the filling thereof.

No references cited.